July 24, 1956   H. D. STURGEON   2,756,022
SHOCK ABSORBER COUPLING FOR ROTARY DRILL STEM
Filed May 25, 1953   2 Sheets-Sheet 1
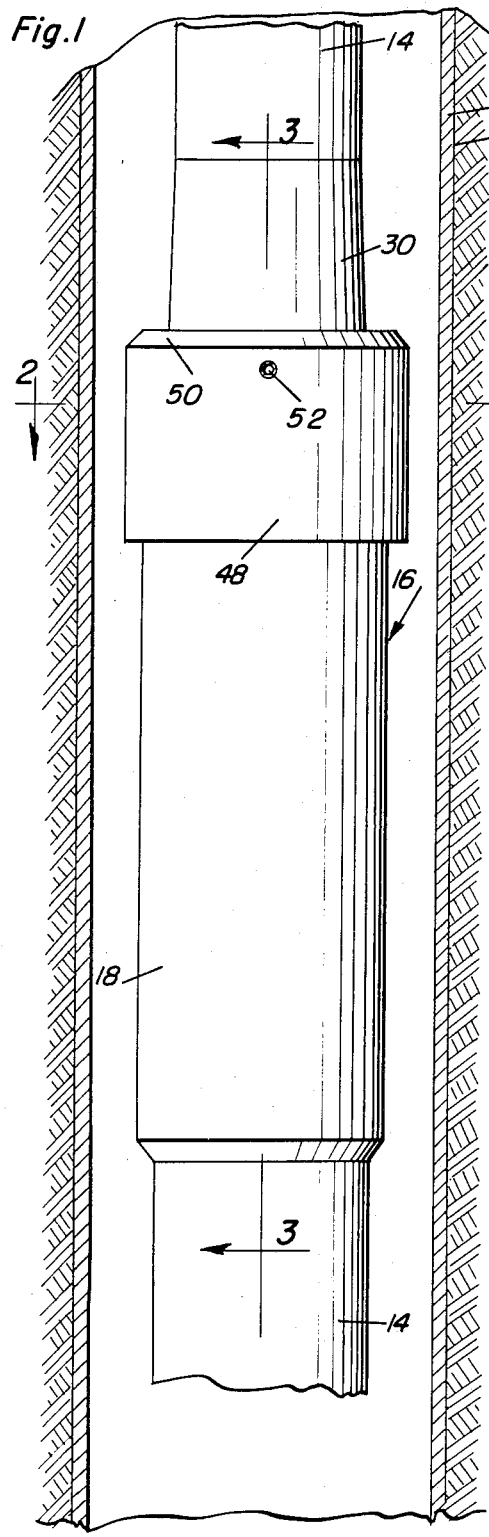
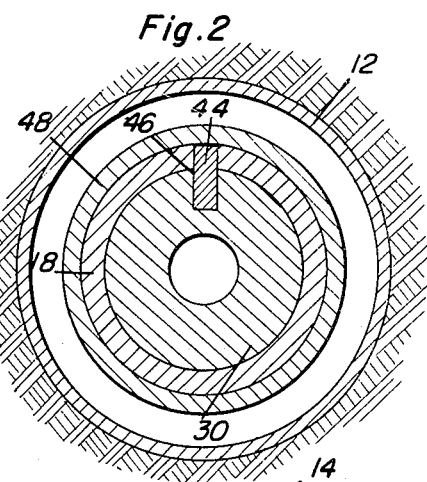
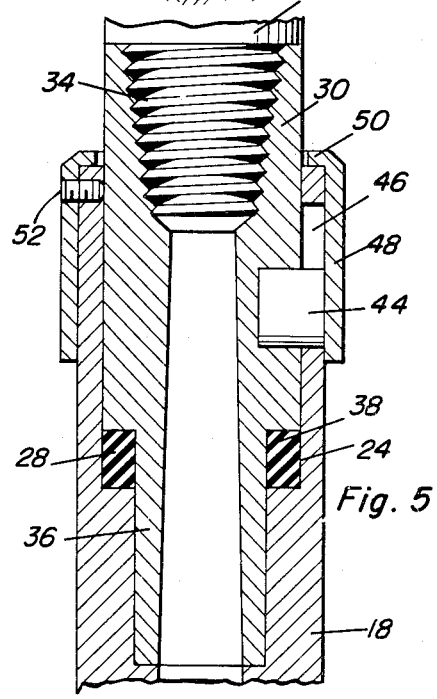
Hugh D. Sturgeon
INVENTOR.

July 24, 1956  H. D. STURGEON  2,756,022
SHOCK ABSORBER COUPLING FOR ROTARY DRILL STEM
Filed May 25, 1953  2 Sheets-Sheet 2

Hugh D. Sturgeon
INVENTOR.

United States Patent Office 2,756,022
Patented July 24, 1956

2,756,022

SHOCK ABSORBER COUPLING FOR ROTARY DRILL STEM

Hugh D. Sturgeon, Thermopolis, Wyo., assignor of fifty per cent to Thomas E. Reed, Thermopolis, Wyo.

Application May 25, 1953, Serial No. 357,058

2 Claims. (Cl. 255—28)

This invention comprises novel and useful improvements in a shock absorber coupling for rotary drill stems and more particularly pertains to a flexible or yieldable coupling constituting a shock sub-assembly to be incorporated into the tubing or drilling stems of rotary drilling rigs.

The primary object of this invention is to provide a shock absorbing or vibration reducing means to be incorporated into the drilling stems of rotary drilling rigs for lessening the shock and vibrations transmitted by the drilling stem to the rotary drilling machinery and the associated equipment of the drilling rig.

A further object of the invention is to provide a device as set forth in the foregoing object which may be detachably interposed in the rotary drill stem at any desired location between the drill and the kelly.

A further object of the invention is to provide a shock absorber coupling forming a part of a rotary drill stem, which will serve to localize vibrations or shock set up in the drill stem by the drilling bit and which will tend to prevent or minimize shocks, jars and vibrations along the drill stem.

A still further object of the invention is to provide a shock absorber coupling of the character above set forth wherein the cushioning means shall also function as a sealing means to prevent escape of the drilling fluid customarily circulated through the tubing or drill stem.

Yet another important object of the invention is to provide a shock absorber coupling of the character set forth above wherein longitudinal movement of the associated parts of the drill stem against a yielding resistance will be permitted, but wherein the transmission of power by the drill stem to the drill bit through rotation of the drill stem will be continuous and uninterrupted.

These together with other objects and advantages which will become apparent reside in the details of construction and operation as more fully hereinafter described and claimed, reference being had to the accompanying drawings forming a part hereof, wherein like numerals refer to like parts throughout, and in which:

Figure 1 is a fragmentary view showing in vertical section a portion of a well bore having a casing therein and a portion of a tubing or drill stem positioned therein during a drilling operation, and showing the shock absorber coupling in accordance with this invention applied thereto;

Figure 2 is a horizontal sectional view taken substantially upon the plane indicated by the section line 2—2 of Figure 1;

Figure 5 is a view similar to Figure 3 but showing the position assumed by the components of the coupling when the latter is subjected to a compressive force or shock.

Referring now to Figure 1 it will be seen that a portion of the well bore 10 is illustrated having the usual well casing 12 positioned therein with a portion of tubing or drilling stem 14 and incorporating therein the shock absorber, sub-assembly or attachment indicated generally by the numeral 16.

It should be understood that the sub-assembly comprising the shock absorber coupling forms a connector or coupling between any pair of adjacent sections of the drill stem, from the kelly to the drill bit. It is of course evident that one or more of these sub-assemblies may be employed should the same be found to be desirable for damping out shocks or vibrations which might be transmitted from the drill head to the drill stem and from the latter to the drill stem rotating mechanism.

Figure 3:
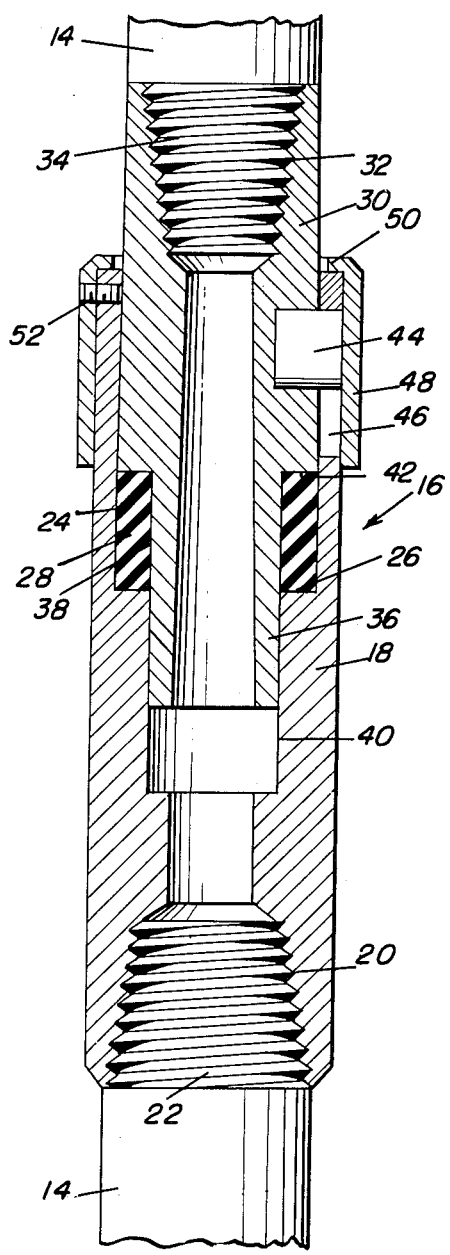
Figure 3 is a vertical central sectional fragmentary view taken substantially upon the plane indicated by the section line 3—3 of Figure 1 and showing the construction of the shock absorber coupling and the position of its component parts during normal operation of the drill stem, and with the weight of the drill stem resting upon the coupling and being transmitted by the latter to the drill bit.
Figure 4:
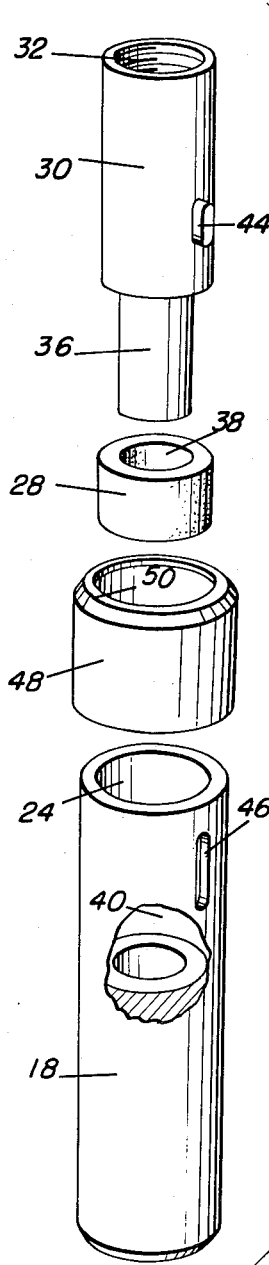
Figure 4 is an exploded perspective view of the various components of the shock absorber coupling.

Referring now more specifically to Figures 3 and 4, it will be seen that the sub-assembly 16 consists of a cylindrical body 18 having an internally threaded bore 20 upon its lower end to receive the adjacent externally threaded portion 22 of the adjacent section of the drill stem 14. The member 18 is hollow and at its open upper end is provided with a diametrically enlarged bore 24 having an annular shoulder 26 on the lower end thereof upon which is seated a cylindrical ring 28 of rubber or any other suitable resilient and cushioning material. A tubular sleeve 30 is provided having an internally threaded upper portion 32 which is adapted to receive the externally threaded lower end portion 34 of the adjacent drill stem section 14. The lower end of the sleeve 30 is diametrically reduced in size to constitute a cylindrical bushing 36 and the latter is slidably received through the axial bore 38 in the cushioning ring 28, and its lower end is slidably received in a guiding bore 40 which communicates with the bore 24. The junction of the bushing 36 with the sleeve 30 provides an annular shoulder 42 which cooperates with the shoulder 26 to engage the opposite sides of the cushioning ring 28, thereby compressing the latter therebetween.

Extending laterally from the side of the member 30 is a lug constituting a key 44 which extends through and is slidably retained in the longitudinal slot 46 formed in the upper portion of the body 18. By means of this key and slot arrangement the member 30 is retained in the member 18 and is permitted axial movement but relative rotation thereof is prevented. This axial movement is, however, limited in one direction by the key engaging the upper end of the slot 46 while in the other direction is limited by the compression of the cushioning ring 28 as the latter is compressed between the shoulders 42 and 26.

A protective sleeve 48 is provided, having an inturned flange 50 upon its upper end. The sleeve 48 is slidably received upon the upper end of the body 18 and the flange 50 abutting upon the upper end of the body serves to position the sleeve and prevent further downward movement of the same. The sleeve is removably retained in place as by a set screw 52 extending through the side of the same into a screw-threaded bore in the body 18.

From the above disclosed construction of the shock absorber coupling, it is believed that the operation of the same will now be readily apparent. When the drill stem is suspended in the well from the drilling rig, as when making a trip, the weight of the drill stem below the coupling 16 is carried by the member 30 by virtue of the engagement of the key 44 in the slot 46 of the body 18. Obviously, a plurality of these keys and slots may be provided if so desired. This weight transmitted by the slots and pins is in turn carried by the member 30, which is supported by the upper portion of the drill stem 14. The position of the parts during this condition of the drill stem has not been illustrated.

When the drill has been lowered into the well, so that the weight of the drill stem rests upon the drill, as during the normal drilling operation, the weight of the upper portion of the drill stem will be transmitted by the threaded extremity 34 of the upper section of the drill stem to the member 30; and from the shoulder 42 of the latter to the cushioning ring 28 and to the shoulder 26 of the body 18; and by the latter through the threaded connections 20 and 22, to those sections of the drill stem which lie therebeneath. At this time, the weight of the drill stem above the coupler is all carried by the cushioning ring 28, whereby the latter is partially compressed. At this time the cylindrical exterior surface of the member 30 which lies adjacent to and immediately above the shoulder 42 will be received within the bore 24 where the same is guided, while the lower portion 36 will be guided in the bore 40. It will thus be seen that a compressively yielding coupling is formed between the upper and lower surfaces of the drill stem by means of the member 28, but that a direct and positive drive is provided between the drill stem sections. This is the position of the parts as shown in Figure 3.

However, when the drill bit is caused to bounce or vibrate during its operation so that occasional upward thrusts are imparted along the drill stem, these shocks and vibrations will cause a further compressive force upon the cushioning ring 28 whereby the latter will be still further compressed as shown in Figure 5. The extent of this compression is limited by the engagement of the lower end of the slot 46 with the bottom surface of the key 44, as shown in Figure 5.

It will thus be apparent that the shocks or vibrations which originate with the drill bit will be damped and thus prevented from travelling up the drill stem to the drilling mechanism. This in turn will prevent excessive wear and damage to the drilling machinery, will prevent excessive vibration of the drill stem which is extremely undesirable in drilling wells. By damping out this vibration and minimizing the effects of shocks upon the drilling stem and the associated mechanism, a more continuous pressure is applied upon the drill bit; the latter is maintained more continuously in contact with the face through which it is cutting; and thus more rapid and straighter operations are effected. As an additional advantage, an increased life of the drilling bit is also obtained by the lessening of the shocks and vibrations.

The shielding sleeve 48 serves chiefly as a safety device to enclose the key and slot connection and prevent the ingress of dirt or the like therein.

It should be noted that a further feature of the cushioning ring is to establish a fluid tight seal between the members 30 and 18, thereby preventing a possible source of leakage of the drilling fluid or mud through this sliding joint between the two members.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A shock-absorber coupling for a drill stem comprising upper and lower tubular bodies having telescopingly connected adjacent end portions, said end portions having registering abutment shoulders, cushioning means interposed between said shoulders yieldingly resisting movement of said bodies toward one another, one of said end portions having a key projecting therefrom, the other of said end portions having a longitudinal slot therein slidably receiving said key and slidably, non-rotatably connecting said bodies to one another, one of said end portions having a pair of stepped cylindrical sections separated by an annular shoulder, the other of said bodies having a pair of cylindrical bores separated by an annular shoulder, each bore slidably receiving one of said cylindrical sections, the annular shoulders of said bores and cylindrical sections constituting said registering abutment shoulders said tubular bodies including connecting means at opposite ends thereof for connection to a drill stem.

2. A shock absorber coupling for a drill stem comprising upper and lower tubular bodies having telescopingly connected adjacent end portions, said end portions having registering abutment shoulders, cushioning means interposed between said shoulders yieldingly resisting movement of said bodies toward one another, the inner one of said end portions having a key projecting therefrom, the outer one of said end portions having a longitudinal slot therein slidably receiving said key and slidably, non-rotatably connecting said bodies to one another, one of said end portions having a pair of stepped cylindrical sections separated by an annular shoulder, the other of said bodies having a pair of cylindrical bores separated by an annular shoulder, each bore slidably receiving one of said cylindrical sections, the annular shoulders of said bores and cylindrical sections constituting said registering abutment shoulders, and a protective sleeve attached to the outer one of said telescopingly connected end portions and enclosing said key and slot within said sleeve, said tubular bodies including connecting means at opposite ends thereof for connection to a drill stem.

References Cited in the file of this patent

UNITED STATES PATENTS

| | | |
|---|---|---|
| 1,660,033 | Braswell | Feb. 21, 1928 |
| 2,240,519 | Reed | May 6, 1941 |
| 2,506,188 | Alviset | May 2, 1950 |
| 2,620,165 | Crickmer | Dec. 2, 1952 |